US008810654B2

(12) United States Patent
Sato

(10) Patent No.: US 8,810,654 B2
(45) Date of Patent: Aug. 19, 2014

(54) IMAGE PICKUP APPARATUS, CONTROL METHOD THEREFOR, AND PROGRAM FOR IMPLEMENTING THE METHOD

(75) Inventor: Asami Sato, Fujisawa (JP)

(73) Assignee: Canon Kabushiki Kaisha (JP)

( * ) Notice: Subject to any disclaimer, the term of this patent is extended or adjusted under 35 U.S.C. 154(b) by 1482 days.

(21) Appl. No.: 11/552,609

(22) Filed: Oct. 25, 2006

(65) Prior Publication Data
US 2007/0115365 A1    May 24, 2007

(30) Foreign Application Priority Data
Nov. 4, 2005    (JP) .................................. 2005-321513

(51) Int. Cl.
*H04N 7/18*      (2006.01)
*H04N 5/232*    (2006.01)
*G08B 13/196*  (2006.01)

(52) U.S. Cl.
CPC .......... *H04N 5/232* (2013.01); *G08B 13/19676* (2013.01); *G08B 13/1963* (2013.01)
USPC ....................................................... 348/151

(58) Field of Classification Search
USPC ....................................................... 348/143
See application file for complete search history.

(56) References Cited

U.S. PATENT DOCUMENTS

| | | | |
|---|---|---|---|
| 5,926,209 A * | 7/1999 | Glatt .............................. | 348/143 |
| 6,392,702 B1 * | 5/2002 | Arai et al. ...................... | 348/335 |
| 6,675,124 B2 * | 1/2004 | Koga ............................. | 702/151 |
| 7,218,352 B2 * | 5/2007 | Hasegawa et al. ....... | 348/333.05 |
| 2003/0215010 A1 * | 11/2003 | Kashiwa .................. | 375/240.02 |
| 2004/0190758 A1 * | 9/2004 | Doi et al. ..................... | 382/115 |
| 2005/0174445 A1 * | 8/2005 | Yamashina ................ | 348/231.7 |

FOREIGN PATENT DOCUMENTS

| | | |
|---|---|---|
| JP | 05-006420 A | 1/1993 |
| JP | 2004-164103 A | 6/2004 |

* cited by examiner

*Primary Examiner* — Christopher S Kelley
*Assistant Examiner* — Tracy Li
(74) *Attorney, Agent, or Firm* — Rossi, Kimms & McDowell LLP

(57) ABSTRACT

An image pickup apparatus which is capable of identifying a criminal e.g. when the image pickup apparatus has been broken, without additionally providing a dedicated sensor for detecting an abnormality. A panhead unit supports a camera unit and rotates the same. A rotary encoder detects a rotating state of the panhead unit. A motor control circuit controls the rotating state of the panhead unit based on the rotating state detected by the rotary encoder. A system control circuit stores an image periodically picked up by the camera unit in the controlled rotating state of the panhead unit in a buffer memory. When the rotating state of the panhead unit is not being controlled based on the rotating state detected by the rotary encoder, a memory control circuit reads out images picked up, respectively, before and after a detection time at which the rotary encoder detected the rotating state, and stores the images in an auxiliary memory.

16 Claims, 4 Drawing Sheets

IMAGE PICKUP APPARATUS, CONTROL METHOD THEREFOR, AND PROGRAM FOR IMPLEMENTING THE METHOD

BACKGROUND OF THE INVENTION

1. Field of the Invention

The present invention relates to an image pickup apparatus, a control method therefor, and a program for implementing the method, and more particularly to an image pickup apparatus that performs monitoring while carrying out panning/tilting control, a control method therefor, and a program for implementing the method.

2. Description of the Related Art

Conventionally, monitoring cameras have been installed in lots of places, such as railroad stations and department stores, for prevention of crimes, and recently, small-sized monitoring cameras have started to come into widespread use as crime-preventive means for home use.

A general monitoring camera picks up an image and displays the image on a monitor installed in a remote place. This enables the user to check the image in real time from the remote place.

Further, another type of monitoring camera has been known which is configured such that picked-up images are stored in a storage device so that the user can check the stored images afterward. A still another type of monitoring camera has also been proposed which is configured such that the storage device for storing images is attachable to and detachable from the monitoring camera itself.

Monitoring cameras can be broken or stolen. Therefore, various methods have been proposed to cope with accidents of theft of monitoring cameras themselves and accidents of damage caused by breaking and theft.

For example, a prior art method is known in which an alarm is sounded when a monitoring camera detects intrusion of a suspicious person by an infrared sensor (see e.g. Japanese Laid-Open Patent Publication (Kokai) No. H05-006420). Another prior art method is also known in which an alarm is sounded when a monitoring camera detects abnormal vibration of an object to be monitored based on input of signals from an external vibration sensor mounted on the object (see e.g. Japanese Laid-Open Patent Publication (Kokai) No. 2004-164103).

However, the above-mentioned conventional methods necessitate an infrared sensor or a vibration sensor which is provided in addition to a monitoring camera only for detecting an abnormality, and hence the construction of the camera becomes complicated, which can cause an increase in manufacturing costs thereof.

SUMMARY OF THE INVENTION

It is an object of the present invention to provide an image pickup apparatus which is capable of identifying a criminal e.g. when the image pickup apparatus has been broken, without additionally providing a dedicated sensor for detecting an abnormality, a control method therefor, and a program for implementing the method.

To attain the above object, in a first aspect of the present invention, there is provided an image pickup apparatus comprising a camera unit, a panhead unit that supports the camera unit and rotates the camera unit, a detector unit that detects a rotating state of the panhead unit, a rotation control unit that controls the rotating state of the panhead unit based on the rotating state detected by the detector unit, a first image storing unit that stores an image periodically picked up by the camera unit in the controlled rotating state of the panhead unit, and a second image storing unit that is operable when the rotating state of the panhead unit is not being controlled based on the rotating state detected by the detector unit, to read out an image picked up at at least one of times before and after a detection time at which the detector unit detected the rotating state, from the first image storing unit, and store the image.

With the arrangement of the image pickup apparatus according to the first aspect of the present invention, the detector unit for use during normal operation can also be used as a sensor for detecting an abnormality, i.e. whether or not the panhead unit has been manually moved. This makes it possible to identify a criminal e.g. when the image pickup apparatus was broken, without additionally providing a dedicated sensor for detecting an abnormality.

Preferably, when the detection time is not a time at which an image is to be periodically picked up, the camera unit picks up an image at the detection time and stores the image in the second storing unit.

With the arrangement of this preferred embodiment, the image pickup apparatus is capable of reliably capturing what is happening when the abnormality is detected.

Preferably, the image stored in the second storing unit is sent to an external information processing apparatus.

With the arrangement of this preferred embodiment, even when the image pickup apparatus was stolen, images picked up immediately before and after the theft are sent to an information terminal in a remote place, which makes it possible to reliably identify a criminal.

Preferably, the image pickup apparatus further comprises an alarm unit that generates an alarm sound at the detection time.

With the arrangement of this preferred embodiment, it is possible to intimidate a criminal who is attempting to steal or break the image pickup apparatus.

Preferably, the image pickup apparatus further comprises a display unit that displays a message indicating that the image is stored in the second storing unit.

To attain the above object, in a second aspect of the present invention, there is provided a control method for an image pickup apparatus having a camera unit, a panhead unit that supports the camera unit and rotates the camera unit, a detector unit that detects a rotating state of the panhead unit, and a rotation control unit that controls the rotating state of the panhead unit based on the rotating state detected by the detector unit, the control method comprising a first image storing step of storing an image periodically picked up by the camera unit in the controlled rotating state of the panhead unit in a first memory, and a second image storing step of reading out an image picked up at at least one of times before and after a detection time at which the detector unit detected the rotating state, from the first memory, and storing the image in a second memory, when the rotating state of the panhead unit is not being controlled based on the rotating state detected by the detector unit.

To attain the above object, in a third aspect of the present invention, there is provided a program for causing a computer to execute a control method for an image pickup apparatus having a camera unit, a panhead unit that supports the camera unit and rotates the camera unit, a detector unit that detects a rotating state of the panhead unit, and a rotation control unit that controls the rotating state of the panhead unit based on the rotating state detected by the detector unit, the program comprising a first image storing module for storing an image periodically picked up by the camera unit in the controlled rotating state of the panhead unit in a first memory, and a second image storing module for reading out an image picked up at at least one of times before and after a detection time at which the detector unit detected the rotating state, from the first memory, and storing the image in a second memory, when the rotating state of the panhead unit is not being controlled based on the rotating state detected by the detector unit.

The above and other objects, features, and advantages of the invention will become more apparent from the following detailed description taken in conjunction with the accompanying drawings.

BRIEF DESCRIPTION OF THE DRAWINGS

FIGS. 2A and 2B are views useful in explaining the mechanism of a panhead unit appearing in FIG. 1, in which:
FIG. 2A is a front view of the panhead unit;
and
FIG. 2B is a top view of the panhead unit.

DETAILED DESCRIPTION OF THE PREFERRED EMBODIMENTS

The present invention will now be described in detail with reference to the drawings showing a preferred embodiment thereof. It should be noted that the relative arrangement of the components, the numerical expressions and numerical values set forth in this embodiment do not limit the scope of the present invention unless it is specifically stated otherwise.

Figure 1:
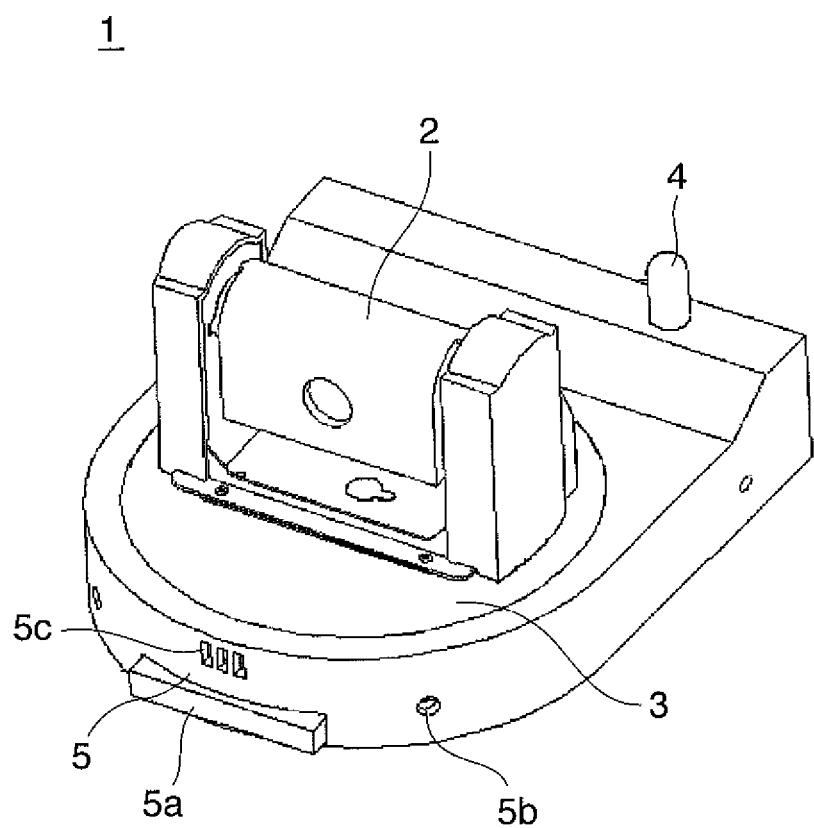
FIG. 1 is a perspective view of an image pickup apparatus according to an embodiment of the present invention.

FIG. 1 is a perspective view of an image pickup apparatus according to an embodiment of the present invention.

Referring to FIG. 1, the image pickup apparatus 1 is comprised of a camera unit 2, a panhead unit 3, a communication unit 4, and a recording unit 5.

The camera unit 2 includes a lens unit, not shown, which is comprised of an image pickup optical system, not shown, formed by a zooming and focusing optical system, an exposure controller, not shown, and a drive system, not shown, for driving the whole camera unit 2. Further, the camera unit 2 includes an image pickup circuit board, not shown, having an image pickup element 101 (see FIG. 3) for picking up images, and a camera circuit board, not shown, having a signal processing circuit 102 (see FIG. 3).

The panhead unit 3 has a pan mechanism 3a (see FIG. 2) comprised of a pan means for supporting the camera unit 2 and horizontally rotating the same, and a tilt mechanism 3b (see FIG. 2) for supporting the camera unit 2 and vertically tilting (rotating) the same. The panhead unit 3 is capable of rotating the shooting direction of the camera unit 2 in a desired direction.

The communication unit 4 has communication capabilities implemented by a network circuit, not shown, a power supply unit, not shown, etc. This enables the present image pickup apparatus 1 to be connected to various information terminals via communication networks, such as a wireless LAN and the Internet.

Figure 3:
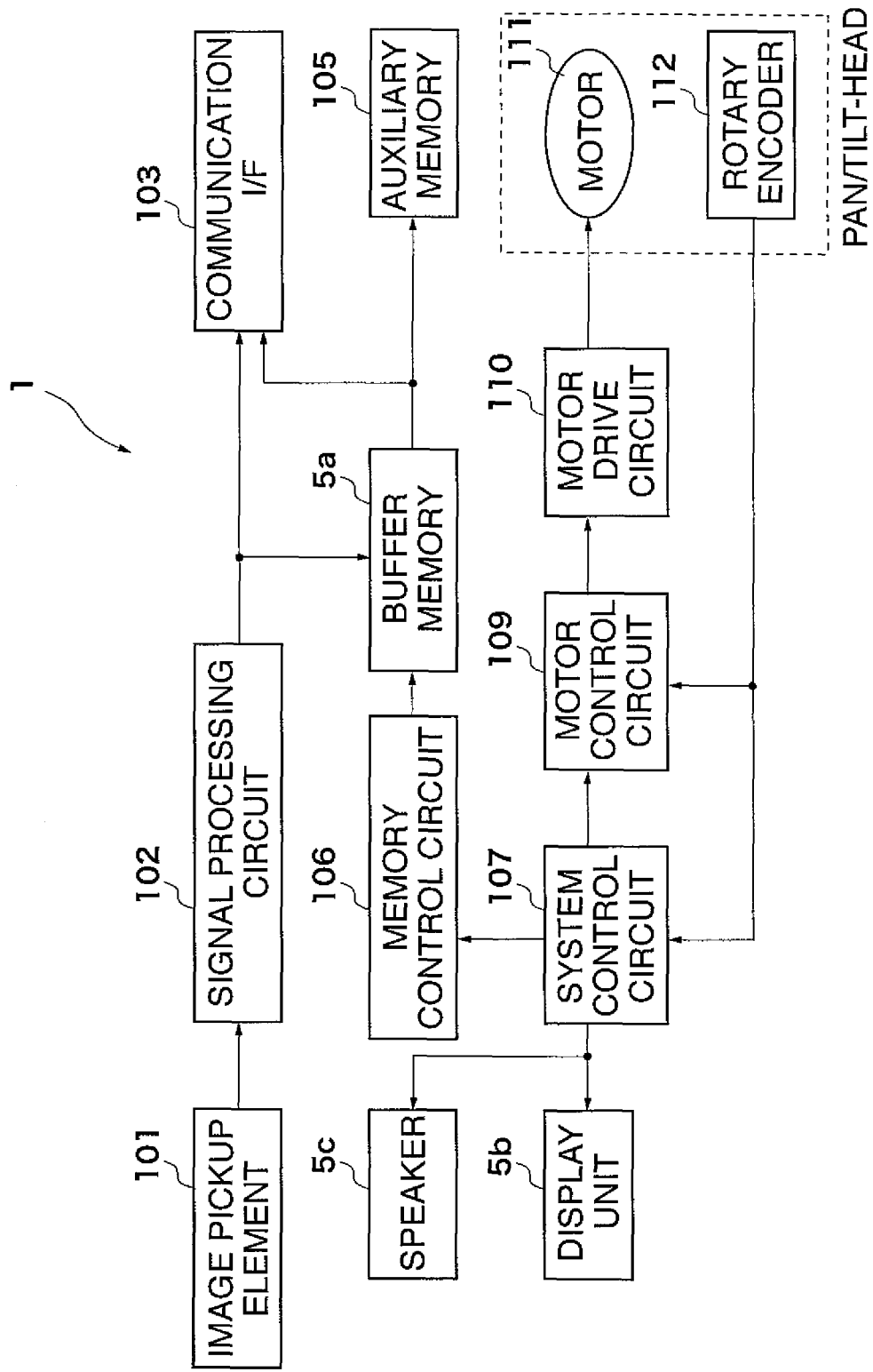
FIG. 3 is a functional block diagram of the image pickup apparatus shown in FIG. 1.

The recording unit 5 is comprised of a buffer memory 5a in which images are written, a display unit 5b for displaying a message or the like indicating that the images are stored in the buffer memory 5a, a speaker 5c for outputting an alarm sound, and an auxiliary memory 105 (see FIG. 3).

The display unit 5b may be implemented e.g. by a liquid crystal display, an organic EL display, an LED display, or any other display having a display function.

Figure 2A:
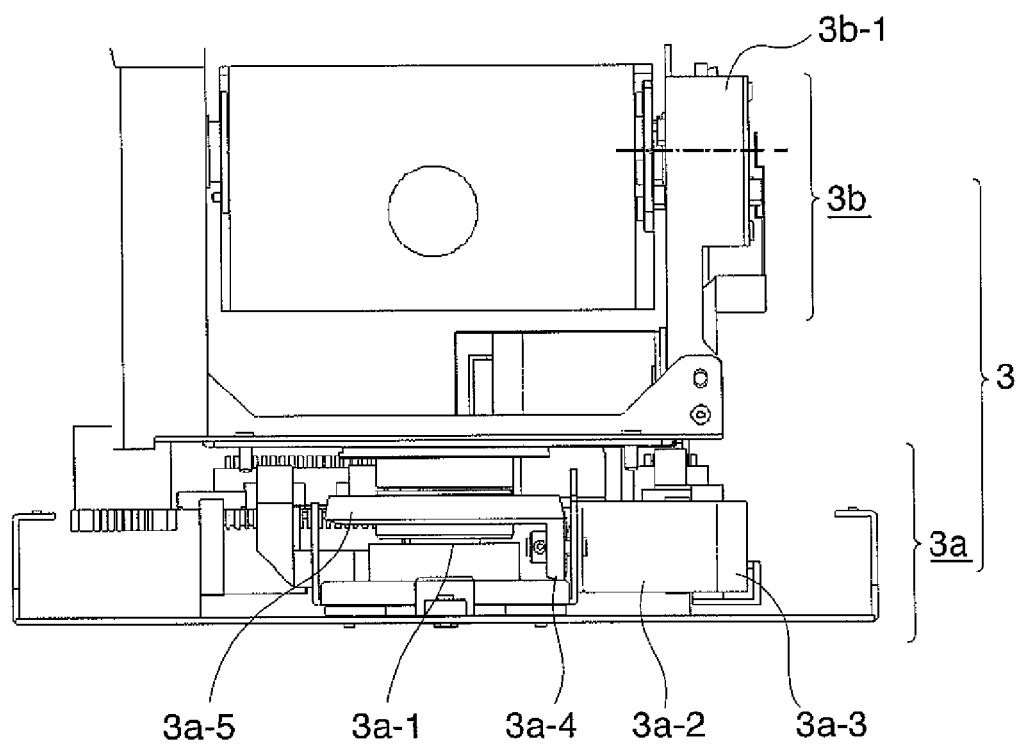
Figure 2B:
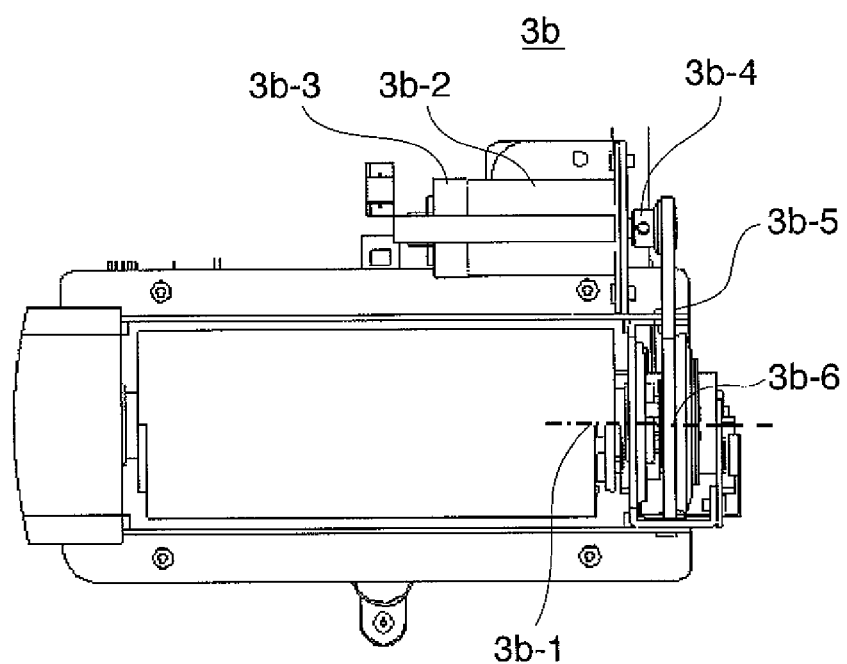

FIGS. 2A and 2B are views useful in explaining the mechanism of the panhead unit 3 appearing in FIG. 1. FIG. 2A is a front view of the panhead unit 3, and FIG. 2B is a top view of the same.

Referring to FIG. 2A, the panhead unit 3 is comprised of the pan mechanism 3a that rotates about the axis of a pan shaft 3a-1 in the panning (horizontal) direction and the tilt mechanism 3b that rotates about the axis of a tilt shaft 3b-1 in the tilting (vertical) direction. Further, the panhead unit 3 is provided with a pan encoder 3a-3 for detecting a pan rotational position and a tilt encoder, not shown, for detecting a tilt rotational position.

In the pan mechanism 3a, a pan motor 3a-2 is driven to rotate a motor gear 3a-4 mounted on a pan motor shaft, not shown, whereby rotation is transmitted to a bevel gear 3a-5 in mesh with the motor gear 3a-4. The bevel gear 3a-5 is coaxially fixed to the pan shaft 3a-1, so that rotation is further transmitted from the bevel gear 3a-5 to the pan shaft 3a-1.

Referring to FIG. 2B, in the tilt mechanism 3b, a tilt motor 3b-2 is driven to rotate a motor pulley 3b-4 mounted on a tilt motor shaft, not shown. Further, rotation is transmitted to a tilt pulley 3b-6 by a timing belt 3b-5 attached to the motor pulley 3b-4. The tilt pulley 3b-6 is coaxially fixed to the tilt shaft 3b-1, so that rotation is further transmitted from the tilt pulley 3b-6 to the tilt shaft 3b-1.

The pan motor 3a-2 and the tilt motor 3b-2 can be implemented by a DC motor, a stepper motor, or any other motor which is capable of outputting a driving force. However, it is preferable to employ an ultrasonic motor which is excellent in responsiveness and can be driven the instant a drive command signal is input thereto. The use of the ultrasonic motor makes it possible to change the shooting direction of the image pickup apparatus 1 by a quick panning/tilting operation. Further, the ultrasonic motor has high holding torque, and hence even in a non-driven state, it is able to hold the position of the image pickup apparatus 1. Furthermore, the ultrasonic motor is capable of outputting high torque at a lower rotational speed than an electromagnetic motor, and hence it is possible to form a motor mechanism part with a lower gear reduction ratio, thereby reducing the size of the entire image pickup apparatus 1.

The pan encoder 3a-3 is attached to the rotating shaft of the pan motor 3a-2, while the tilt encoder is attached to the rotating shaft of the tilt motor 3b-2.

The pan encoder 3a-3 detects rotation of the rotating shaft of the pan motor 3a-2. The rotation of the rotating shaft of the pan motor 3a-2 detected by the pan encoder 3a-3 includes not only rotation caused by driving of the pan motor 3a-2 but also rotation caused by an external manual rotation of the panhead unit 3.

Similarly, the rotation of the rotating shaft of the tilt motor 3b-2 detected by the tilt encoder includes not only rotation caused by driving of the tilt motor 3b-2 but also rotation caused by an external manual rotation of the panhead unit 3.

FIG. 3 is a functional block diagram of the image pickup apparatus 1 shown in FIG. 1.

As shown in FIG. 3, the image pickup apparatus 1 includes a system control circuit 107 for controlling the overall operation of the apparatus 1, and a rotary encoder 112 comprised of the pan encoder 3a-3 and the tilt encoder. Further, the image pickup apparatus 1 includes a motor 111 comprised of the pan motor 3a-2 and the tilt motor 3b-2, a motor drive circuit 110 for driving the motor 111, and a motor control circuit 109 for controlling the motor drive circuit 110.

Still further, the image pickup apparatus 1 includes the image pickup element 101 on the image pickup circuit board of the camera unit 2, the signal processing circuit 102 on the camera circuit board of the camera unit 2, a communication I/F 103 provided in the communication unit 4, and the buffer memory 105a provided in the recording unit 5 (see FIG. 1). The image pickup apparatus 1 also includes the auxiliary memory 105 implemented by a large-capacity hard disk, which is also provided in the recording unit 5, the display unit 5b, and the speaker 5c.

First, when a signal (encoder signal) indicating that rotation has been detected is delivered from the rotary encoder 112 to the system control circuit 107, the system control circuit 107 determines whether the motor 111 is in a driven state or in a stopped state.

If it is determined that the motor 111 is in the driven state, the system control circuit 107 controls the motor 111 via the motor control circuit 109 and the motor drive circuit 110 based on the output signal from the rotary encoder 112. On the other hand, the system control circuit 107 periodically converts a signal of an image picked up by the image pickup element 101 into data in a storage format using the signal processing circuit 102. The data in the storage format is cyclically recorded in the buffer memory 5a, for updates.

On the other hand, if it is determined that the motor 111 is in the stopped state, i.e. if the panhead unit 3 was moved manually, the system control circuit 107 delivers a movement detection signal to a memory control circuit 106. When receiving the movement detection signal, the memory control circuit 106 reads out an image stored a predetermined time period before the delivery of the movement detection signal and an image stored a predetermined time period after the delivery of the movement detection signal, out of images stored in the buffer memory 5a. It should be noted that the memory control circuit 106 may read out only one of the two above images. Thereafter, the memory control circuit 106 adds, to the read images, management data including a serial number indicating which one of movement detection signals output so far the read images correspond to, and a generation time, and then records the images having the management data added thereto in the auxiliary memory 105.

Then, the system control circuit 107 sends the images recorded in the auxiliary memory 105 to a remote information terminal via the communication I/F 103 and the communication network.

The system control circuit 107 outputs the movement detection signal to the speaker 5c and the display unit 5b as well. When receiving the movement detection signal, the speaker 5c outputs the alarm sound, and the display unit 5b displays a message indicating that the images are stored.

When it is determined that the motor 111 is in the stopped state, the system control circuit 107 determines at this time point whether or not the periodical image pickup is to be performed by the image pickup element 101. If the periodical image pickup is not to be performed, the system control circuit 107 causes the image pickup element 101 to perform the image pickup, and converts a signal of the picked-up image into data in the storage format using the signal processing circuit 102, followed by sending the data to the memory control circuit 106. When receiving the data of the picked-up image, the memory control circuit 106 stores the data in the auxiliary memory 105. The system control circuit 107 also sends the data of the image recorded in the auxiliary memory 105 to the remote information terminal via the communication I/F 103 and the communication network.

Although in the present embodiment, the auxiliary memory 105 is implemented by a large-capacity hard disk, this is not limitative, but any recording medium can be employed insofar as it is capable of holding data even in a power-off state.

Hereafter, the procedure of the shooting process generally described with reference to FIG. 3 will be described in more detail using a flowchart shown in FIG. 4.

Figure 4:
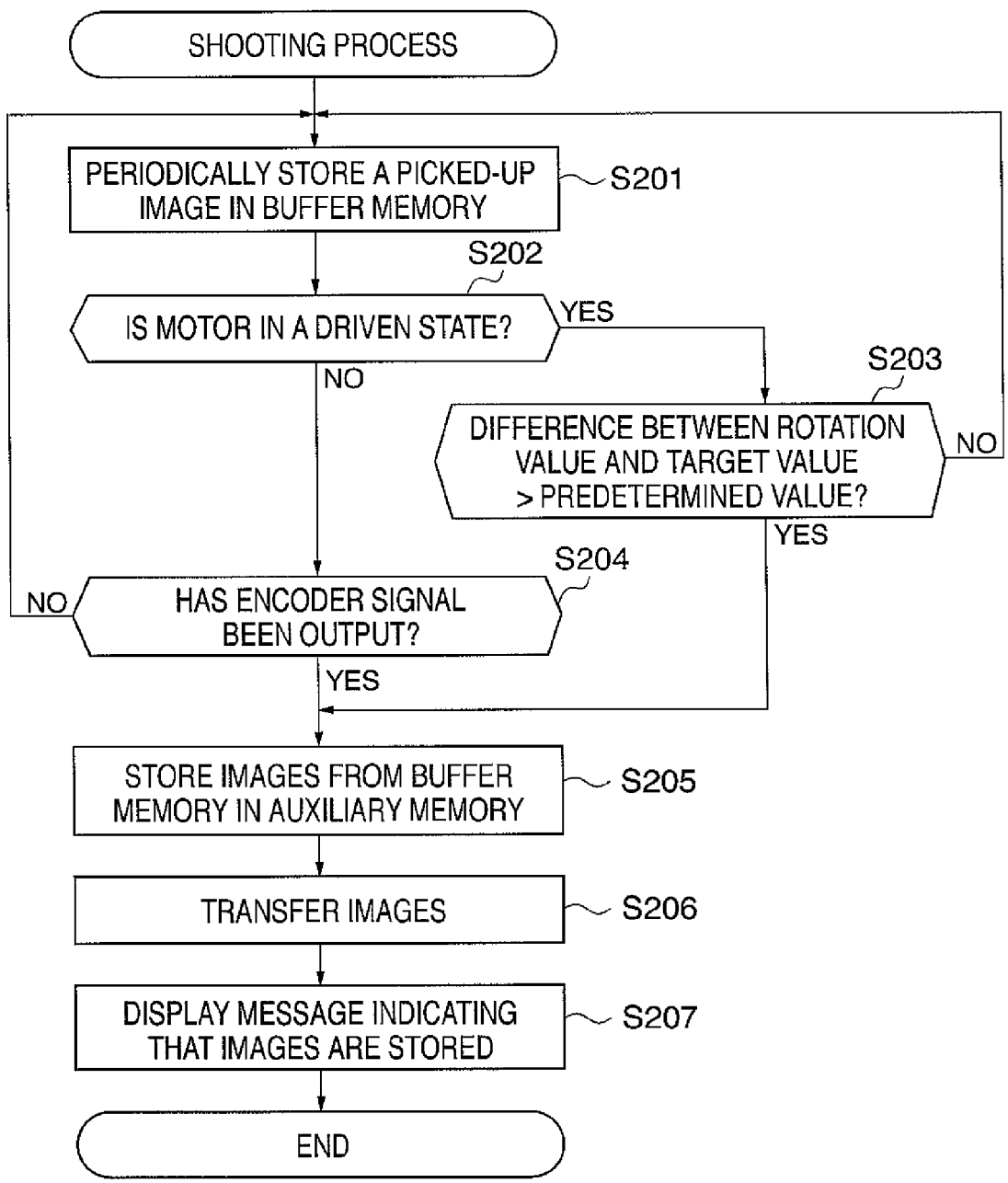
FIG. 4 is a flowchart showing the procedure of a shooting process carried out by the image pickup apparatus.

FIG. 4 is the flowchart showing the procedure of the shooting process carried out by the image pickup apparatus 1.

Referring to FIG. 4, first, when an image is periodically picked up by the image pickup element 101, the picked-up image is stored in the buffer memory 5a (step S201).

Then, it is determined whether or not the motor is in the driven state (step S202). If the motor is in the driven state, the process proceeds to a step S203, whereas if the motor is not in the driven state, i.e. is in the stopped state, the process proceeds to a step S204.

In the step S203, a rotation value is read out from an encoder signal output from the rotary encoder 112 after the driving of the motor, which was determined being in the driven state in the step S202, and then it is determined whether or not the difference between the rotation value and its target value is within a predetermined value set in advance by the user. If the difference is within the predetermined value (NO to the step S203), it is judged that control is being properly carried out, and the process returns to the step S201, whereas if the difference is not within the predetermined value (YES to the step S203), it is judged that the panhead unit 3 was manually moved, and the process proceeds to a step S205.

On the other hand, in the step S204, it is determined whether or not an encoder signal has been output from the rotary encoder 112. If an encoder signal has not been output (NO to the step S204), it is judged that control is being properly carried out, and the process returns to the step S201, whereas if an encoder signal has been output (YES to the step S204), it is judged that the panhead unit 3 was manually moved, and the process proceeds to the step S205.

In the step S205, images from the buffer memory 5a are stored in the auxiliary memory 105. When the present step S205 follows the step S204, the images stored here are ones picked up before and after the time the encoder signal was delivered. On the other hand, when the present step S205 follows the step S203, the images stored here are ones picked up before and after the time the difference between the rotation value read out from the output encoder signal and its target value became larger than the predetermined value, out of times the encoder signal was delivered. It should be noted that the length of a time interval at which the images are to be stored in the auxiliary memory 105 can be set in advance by the user. Further, at this time, the alarm is sounded from the speaker 5c, which makes it possible to intimidate a criminal who is attempting to steal or break the image pickup apparatus 1.

Next, the images stored in the auxiliary memory 105 in the step S205 are sent to a remote information terminal via the communication network (step S206). Thus, even when the image pickup apparatus 1 was stolen, it is possible to send images picked up immediately before and after the theft event to the remote information terminal, whereby a criminal can be reliably identified.

Thereafter, the display unit 5b displays a message or the like indicating that the images have been stored (step S207), followed by terminating the present process.

According to the process shown in FIG. 4, when the rotating state of the panhead unit 3 is being properly controlled based on the encoder signal output from the rotary encoder 112, an image periodically picked up is stored in the buffer memory 5a (steps S201 to S204). On the other hand, when it is determined that the rotating state of the panhead unit 3 is not being properly controlled, i.e. that the panhead unit 3 was manually moved (YES to the step S203 or the step S204), images picked up immediately before and after the time the encoder signal was generated are read out from the buffer memory 5a, and then the read images are stored in the auxiliary memory 105 (step S205). This makes it possible to use the rotary encoder 112 for use during normal operation also as a sensor for detecting an abnormality, i.e. whether or not the panhead unit 3 was manually moved. This makes it possible to identify e.g. a criminal who broke the image pickup apparatus 1, without providing the image pickup apparatus 1 with a dedicated sensor for detecting an abnormality.

When it is determined in the step S204 that the encoder signal has been generated, if periodical image pickup in the step S201 was not performed at the time of generation of the signal, the image pickup element 101 may be caused to pick up an image at this time to store the picked up image as well in the auxiliary memory 105. This enables the image pickup apparatus 1 to reliably capture what is happening when an abnormality is detected.

It is to be understood that the object of the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

In this case, the program code may be supplied directly from a storage medium in which the program code is stored, or from another computer, not shown, a database, not shown, or the like that is connected to the Internet, a commercial network, a local area network, or the like.

This application claims the benefit of Japanese Application No. 2005-321513, filed Nov. 4, 2005, which is hereby incorporated by reference herein in its entirety.

What is claimed is:

1. A control apparatus for controlling a pickup direction of a camera unit, comprising:
- a determining unit that determines a driving state of a motor, the motor being for changing the pickup direction of the camera unit;
- a detector unit that detects a change of the pickup direction; and
- a processing unit that instructs, in response to contemporaneous satisfaction of conditions of (1) detection of the change of the pickup direction by the detector unit and (2) a determination by the determining unit that the motor for changing the pickup direction of the camera unit is not driven, execution of at least:
- (a) a storing control processing for storing in a memory at least an image picked up before, after, or both before and after the contemporaneous satisfaction of the conditions of (1) and (2),
- (b) an outputting processing for outputting an alert, or both (a) and (b).

2. The apparatus according to claim 1, wherein a timing for storing the image to the memory in response to the contemporaneous satisfaction of conditions of (1) and (2) is not a timing at which an image is to be periodically picked up.

3. The apparatus according to claim 1, wherein the processing unit causes transmission of the image stored in the memory to an external information processing apparatus.

4. The apparatus according to claim 1, further comprising an alarm unit that generates an alarm sound in accordance with the outputting of the alert.

5. The apparatus according to claim 1, further comprising a display unit that displays an alert message in accordance with the outputting of the alert.

6. The apparatus according to claim 1, wherein the processing unit causes execution of the storing control processing for storing the image to the memory such that an image picked up based on a timing at which a difference between a target value based on a control signal for driving the motor and a rotation value of the motor based on the control signal for driving the motor is determined to exceed a predetermined value is stored in the memory.

7. The apparatus according to claim 1, wherein the change of the pickup direction is a change in pan or tilt of the pickup direction.

8. The apparatus according to claim 1, wherein the processing unit instructs the execution of at least (a), (b), or both (a) and (b), based on a present pickup direction of the camera unit and a target pickup direction thereof.

9. A control method for a control apparatus for controlling a pickup direction of a camera unit, the control method comprising:
- a determining step of determining a driving state of a motor, the motor being for changing the pickup direction of the camera unit;
- a detecting step of detecting a change of the pickup direction; and
- a processing step of instructing, in response to contemporaneous satisfaction of conditions of (1) detection of the change of the pickup direction in the detecting step and (2) a determination in the determining step that the motor for changing the pickup direction of the camera unit is not driven, execution of at least:
- (a) a storing control processing for storing in a memory at least an image picked up before, after, or both before and after the contemporaneous satisfaction of the conditions of (1) and (2),
- (b) an outputting processing for outputting an alert, or both (a) and (b).

10. The method according to claim 9, wherein the processing step causes execution of the storing control processing for storing of the image to the memory such that an image picked up based on a timing at which a difference between a target value based on a control signal for driving the motor and a rotation value of the motor based on control signal for driving the motor is determined to exceed a predetermined value is stored in the memory.

11. The method according to claim 9, wherein the change of the pickup direction is a change in pan or tilt of the pickup direction.

12. The method according to claim 9 further comprising a second processing step of instructing the execution of at least (a), (b), or both (a) and (b), based on a present pickup direction of the camera unit and a target pickup direction thereof.

13. A non-transitory computer-readable storage medium storing a computer program for causing a computer to execute a control method for a control apparatus for controlling a pickup direction of a camera unit, the program comprising:
 a determining module for determining a driving state of a motor, the motor being for changing the pickup direction of the camera unit;
 a detecting module for detecting a change of the pickup direction; and
 a processing module for instructing, in response to contemporaneous satisfaction of conditions of (1) detection of the change of the pickup direction by the detecting module and (2) a determination by the determining module that the motor for changing the pickup direction of the camera unit is not driven, execution of at least:
 (a) a storing control processing for storing in a memory at least an image picked up before, after, or both before and after the contemporaneous satisfaction of the conditions of (1) and (2),
 (b) an outputting processing for outputting an alert, or both (a) and (b).

14. The medium according to claim 13, wherein the processing module causes execution of the storing control processing for storing the image to the memory such that an image picked up based on a timing at which a difference between a target value based on a control signal for driving the motor and a rotation value of the motor based on the control signal for driving the motor is determined to exceed a predetermined value is stored in the memory.

15. The medium according to claim 13, wherein the change of the pickup direction is a change in pan or tilt of the pickup direction.

16. The medium according to claim 13, the processing module instructs the execution of at least (a), (b), or both (a) and (b), based on a present pickup direction of the camera unit and a target pickup direction thereof.

* * * * *